United States Patent [19]

Ekimovskikh et al.

[11] 3,921,060

[45] Nov. 18, 1975

[54] VHF-BAND PULSE RADIOSPECTROMETER FOR THE STUDY OF NUCLEAR QUADRUPOLE RESONANCE IN SOLID SPECIMENS

[76] Inventors: Ivan Alexandrovich Ekimovskikh, ulitsa Lenina, 23, kv. 21; Boris Grigorievich Ignatov, ulitsa Lenina, 26, kv. 22, both of Fryazino Moskovskoi oblasti, U.S.S.R.

[22] Filed: Mar. 4, 1974

[21] Appl. No.: 447,772

[52] U.S. Cl. .......................... 324/0.5 A; 324/0.5 AH
[51] Int. Cl.² ........................................ G01N 27/00
[58] Field of Search ......... 324/0.5 R, 0.5 A, 0.5 AH

[56] References Cited
UNITED STATES PATENTS

| | | | |
|---|---|---|---|
| 3,474,328 | 10/1969 | Webb | 324/0.5 A |
| 3,808,518 | 4/1974 | Ignatov | 324/0.5 R |

*Primary Examiner*—Alfred E. Smith
*Assistant Examiner*—Michael J. Tokar
*Attorney, Agent, or Firm*—Haseltine, Lake & Waters

[57] ABSTRACT

A VHF-band pulse radiospectrometer for the study of nuclear quadrupole resonance in solid specimens, comprising a high-frequency pulse oscillator having an inductance coil adapted to accommodate the specimen being investigated and a superheterodyne receiver for signals of the signals of nuclear quadrupole resonance signals. An element for retuning the anode circuit of the pulse oscillator is coupled to an element for retuning a heterodyne or variable oscillator circuit via an automatic frequency retuning unit, one input thereof being connected to the output of the pulse oscillator and the other input to the variable oscillator output. The output of the automatic retuning unit is connected to an electric motor controlling the element for retuning the variable oscillator circuit. The retuning elements are variable capacitors. A feedback circuit of the pulse oscillator includes a variable reactance connected to the anode circuit of the pulse oscillator in such a manner that the value of this reactance is varied in accordance with the changing value of the retuning element of the anode circuit of the pulse oscillator.

2 Claims, 4 Drawing Figures

VHF-BAND PULSE RADIOSPECTROMETER FOR THE STUDY OF NUCLEAR QUADRUPOLE RESONANCE IN SOLID SPECIMENS

The present invention relates to radiospectrometers, and more particularly to VHF-band pulse radiospectrometers used for investigating nuclear quadrupole resonance in solid specimens for the purpose of determining their physicochemical properties.

Known in the art are VHF-band pulse radiospectrometers used in the study of nuclear quadrupole resonance in solid specimens, comprising a high-frequency pulse oscillator and an inductance coil adapted to accommodate the specimen being invenstigated, and having a superheterodyne receiver for receiving the nuclear quadrupole resonance signals, the element for retuning the anode circuit of the high-frequency pulse oscillator being kinematically coupled to the heterodyne circuit retuning element by means of a program device embodied in the form of a cam mechanism.

A disadvantage of the prior art radiospectrometers resides in the low operational reliability of the high-frequency pulse oscillator and the heterodyne, or variable-frequency oscillator, incorporating long circuit lines, the disadvantage being due to the poor contact properties between short-circuit bridges and the long circuit lines characteristic of these oscillators, as well as the difficulties experienced in the manufacture and calibration of the kinematic program device and the necessity of changing completely the program of the device as a result of an accidental change of the parameters of the anode circuit of the high-frequency pulse oscillator, which in the final analysis causes decreased sensitivity of the raidospectrometer to the weak signals of nuclear quadrupole resonance.

It is an object of the present invention to provide a VHF-band pulse radiospectrometer for use in the study of nuclear quadrupole resonance in solid specimens, having contactless retuning of the oscillator frequency, following a linear law, and automatic frequency matching of the high-frequency pulse oscillator, resulting in improved performance characteristic of the radio-spectrometer and finer sensitivity thereof to weak nuclear quadrupole resonance signals.

The object of the invention is embodied in a VHF-band pulse radiospectrometer for the study of nuclear quadrupole resonance in solid specimens, which comprises a high-frequency pulse oscillator with an inductance coil adapted to accommodate the specimen being investigated and a superheterodyne receiver for the nuclear quadrupole resonance signals, and a retuning element for the anode circuit of the high-frequency pulse oscillator, coupled to a retuning element for a heterodyne or variable oscillator circuit. According to invention, the coupling of the retuning elements is achieved by means of an automatic frequency retuning unit, one input thereof being connected to the output of the pulse oscillator and the other input to the variable oscillator output, the signal derived from the output of the automatic retuning unit being applied across an electric motor to control the variable oscillator circuit retuning element; and variable capacitors are used for the retuning elements.

The feedback circuit of the high-frequency pulse oscillator is preferably provided with an adjustable reactance connected to the anode circuit of the pulse oscillator in such a manner that the value of this reactance is a function of the inductance value, anode circuit of the the latter value being a variable.

The novel arrangement wherein a high-frequency pulse oscillator is used in conjunction with a contactless circuit for retuning the frequency, and with a variable reactance provided in the feedback circuit, together with an automatic heterodyne or variable frequency oscillator returning unit embodied as a contactless frequency retuning circuit, has made it possible to improve the reliability of the novel radiospectrometer and to obtain high and uniform sensitivity thereof to weak nuclear quadrupole resonance signals within the working frequency range.

The present invention is illustrated by way of the description of an exemplary, preferred embodiment thereof, taken in conjuction with the accompanying drawings, wherein.

Figure 1:
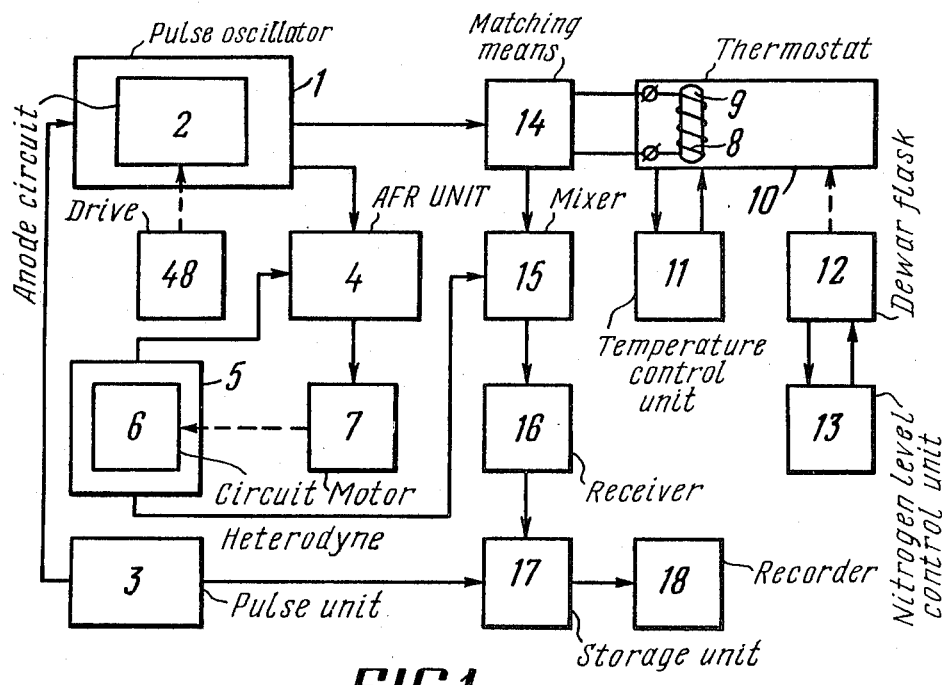
FIG. 1 is a block diagram of a VHF-band pulse radiospectrometer for the study of nuclear quadrupole resonance in solid specimens, according to the invention.

The VHF-band pulse raidospectrometer according to the present invention, for the study of nuclear quadrupole resonance in solid specimens, is shown in FIG. 1 and comprises a high-frequency pulse oscillator 1 with an anode circuit 2, the input of the oscillator being connected to a pulse unit 3, whereas one of the outputs thereof is connected to the input of an automatic frequency retuning unit (AFR) 4 of a heterodyne or variable frequency oscillator 5. To the other input of unit 4 there is connected the output of the oscillator 5 which has a circuit 6. The output of the automatic frequency retuning unit 4 is connected to an electric motor 7 whose output shaft is coupled with a retuning element of the circuit 6.

The other output of the high-frequency pulse oscillator 1 is electrically coupled to an inductance coil 8 having fixedly secured therein an investigated solid specimen 9, the coil 8 being placed in a thermostat 10, wherein the temperature is maintained constant in a preset range of from −170°C to +200°C by means of a temperature control unit 11.

In investigating the physicochemical properties of the solid specimen 9 at the liquid nitrogen temperature the inductance coil 8 with the investigated specimen 9 is placed in a Dewar flask 12 wherein the level of nitrogen is maintained constant by means of a device 13 for maintaining a preset level of liquid nitrogen.

The inductance coil 8 is electrically coupled to the high-frequency pulse oscillator 1 via a means 14 for matching the resistance of the inductance coil 8 with the resistance of the anode circuit 2 of the oscillator 1.

The matching means 14 is connected to a mixer 15 to which the variable oscillator 5 is coupled. The output of the mixer 15 is connected to a receiver 16 which latter is in turn connected via a storage unit 17 to a recorder 18. The pulse unit 3 is connected to the storage unit 17.

The receiver 16, the mixer 15 and the oscillator 5 make up a superheterodyne receiver for receiving the nuclear quadrupole resonance signals.

Figure 2:
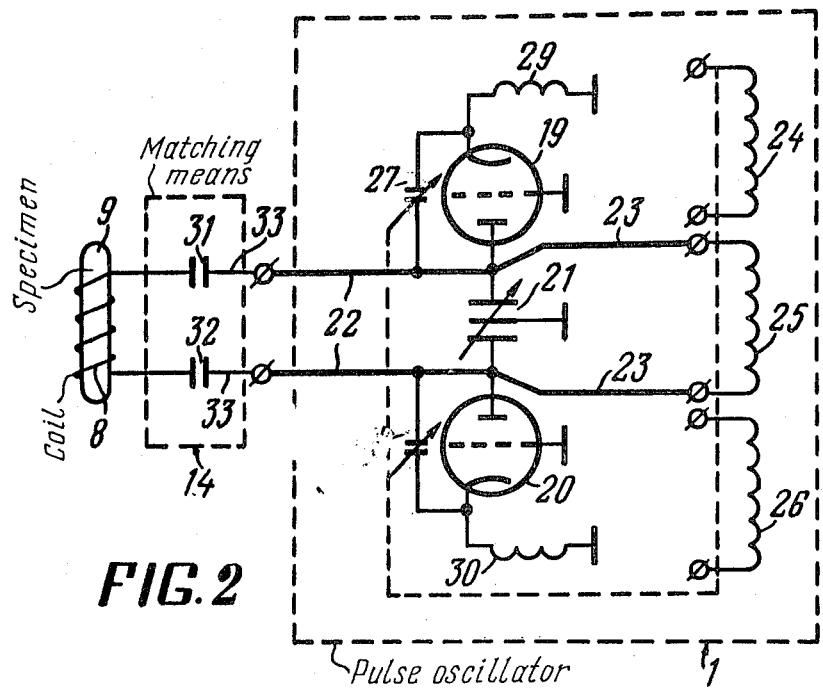
FIG. 2 is a circuit diagram of the high-frequency pulse oscillator and matching means with an inductance coil and the investigated solid specimen in the pulse radiospectrometer.

In the described embodiment of the radiospectrometer, the high-frequency pulse oscillator 1 (FIG. 2) is embodied as a single-circuit self-excited oscillator with controlled feedback, built around a common-grid push-pull circuit.

The anode circuit 2 of the oscillator 1 is formed by a combination of the output capacitances of high-frequency medium-power tubes 19 and 20, a variable air capacitor 21, a tuning element, two sections 22 and 23 of long two-conductor symmetrical lines and one of A drive 48 for capacitor 21 will be described later.

The inductance coil 8 with the investigated specimen 9 is connected via the matching means 14 to the section 22 of the symmetrical line.

In order to provide for an optimal oscillation mode, variable reactances 27 and 28 are connected to the feedback circuit of the oscillator 1.

The range of working frequencies of the oscillator 1 is subdivided into a number of subranges, the commutation of which is effected by switching over the inductance coils 24, 25 and 26. In this case, simultaneously with the connection of one of the inductance coils 24, 25 or 26 into the circuit 2 of the oscillator 1, the value of the variable reactances 27 and 28 changes, the latter being mechanically coupled to a switch (not shown) of the coils 24 to 26.

Variable capacitors are used in the present embodiment of the high-frequency pulse oscillator 1 as the variable reactances 27 and 28 in the feedback circuit of the oscillator 1.

Variable inductance coils may be used as the variable reactances 27 and 28, however variable capacitors appear to be more convenient.

The cathodes of the tubes 19 and 20 are grounded via high-frequency chokes 29 and 30.

The means 14 for matching the resistance of the inductance coil 8 with the resistance of the anode circuit 2 of the high-frequency pulse oscillator 1 is in the form of two capacitors 31 and 32, connected directly to the ends of the inductance coil 8, and to a section 33 of a two-wire symmetrical long line, the section connecting the capacitors 31 and 32 to the section 22 of the two-wire symmetrical line of the anode circuit 2 of the high-frequency pulse oscillator 1.

Figure 3:
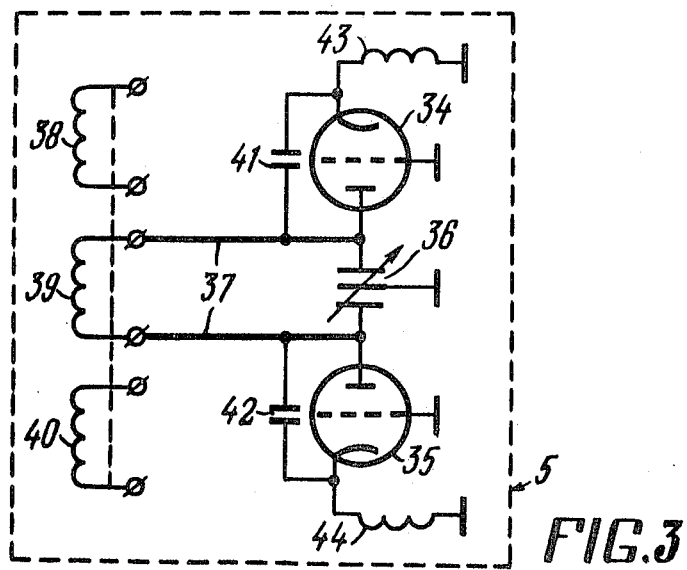
FIG. 3 is a circuit diagram of a variable frequency oscillator for the radiospectrometer.

The variable oscillator 5 (FIG. 3) in the present radiospectrometer is embodied as a single-circuit self-excited oscillator with contactless frequency tuning, and is built around a push-pull circuit with a common grid.

The circuit of the heterodyne 5 is formed by the output capacitances of high frequency low-power tubes 34 and 35, the capacitance of a variable air capacitor 36, a tuning means, a section 37 of a two-wire symmetrical line, and by the inductance of one of inductance coils 38, 39 and 40.

The feedback circuit of the variable frequency oscillator 5 is formed by capacitors 41 and 42 connected between the anodes and cathodes of the tubes 34 and 35. These cathodes are grounded via high-frequency chokes 43 and 44. The capacitor 36 serves for varying the frequency of the oscillator 5, the rotor of the capacitor 36 being coupled to the electric motor 7 (FIG. 1), which motor derives a signal from the automatic frequency retuning unit 4 of the oscillator 5.

Figure 4:
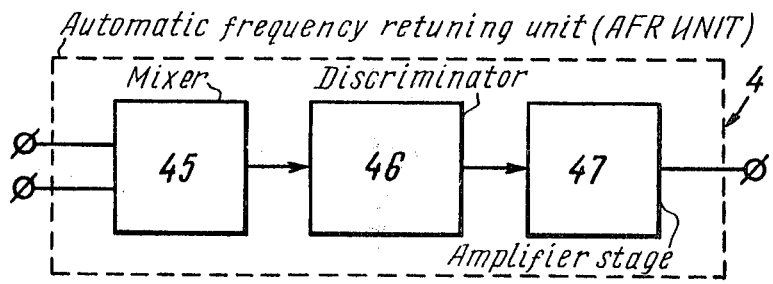
FIG. 4 is a block diagram of the automatic heterodyne frequency retuning unit of the radiospectrometer.

In the described radiospectrometer, the automatic retuning unit 4 (FIG. 4) is built around electron tubes and serves for tuning the oscillator frequency by that of the high-frequency pulse oscillator 1.

The retuning unit 4 comprises a mixer 45, one input thereof deriving a signal from the high-frequency pulse oscillator 1, whereas the other input is connected to the output of oscillator 5, the output of said mixer 45 being connected to a discriminator 46. The output of the discriminator 46 is connected to the input of an amplifier stage 47 whose output is connected to the electric motor 7 (FIG. 1), controlling the retuning means of the oscillator circuit. One more element of the inventive radiospectrometer, a drive 48 for the variable capacitor of oscillator unit 1, will be explained further down.

In the herein-disclosed embodiment of a pulse radiospectrometer, the pulse unit 3 (FIG. 1) is also built around electron tubes and intended for presetting the time intervals and shaping modulation pulses of the high-frequency pulse oscillator 1.

The mixer 15 is built around a push-pull circuit comprising two high-frequency triodes. The signal voltage derived from the matching means 14 is applied across the grids of the tubes of the mixer 15. The anode load of the mixer 15 is a resonance circuit tuned to an intermediate frequency. The receiver is an intermediate-frequency amplifier with an adjustable passband from 100 to 800 kHz. The storage unit 17 is a capacitance-type pulse signal storage.

The thermostat 10 is embodied in the form of a chamber accommodating therein the inductance coil 8 with the specimen 9 being investigated. A heating element, electrically connected to the temperature control unit 11, is wound around the chamber walls.

A platinum thermometer, secured to the outside of one of the chamber walls, relays the temperature to the control unit 11. In order to obtain temperatures under +50°C, the chamber is cooled with liquid nitrogen.

The temperature control unit 11 comprises an automatic adjusting bridge and a voltage controller.

The means 13 for maintaining the preset level of nitrogen comprises a thin conduit having a heater at one end thereof and a valve at the other end, a transistorized heater control circuit and a nitrogen level sensor built around a semiconductor diode.

The means 13 is accommodated in the neck of the Dewar flask. The operating principle of the VHF-band pulse radiospectrometer for the study of nuclear quadrupole resonance in solid specimens according to the present invention is as follows.

The high-frequency pulse oscillator 1 initiates a train of short high-power radiofrequency pulses, one, two or four, depending on the operating mode of the radiospectrometer, which mode is set by the driving pulse unit 3. The energy of high-power pulses from the oscillator 1 acts via the matching means 14 upon the specimen 9 being investigated which is arranged inside the inductance coil 8.

When the specimen 9 is subjected to the effect of two high-power radiopulses and the filling frequency of the radiopulses coincides with the nuclear quadrupole resonance frequency of the substance, a nuclear induction signal appears after the first pulse, and after a period of time equal to double the interval between the pulses, there appears a spin echo signal. These signals are received by the inductance coil 8 and pass via the mixer 15 to the input of the receiver 16. From the output of the receiver 16, the nuclear induction and spin echo signals arrive at the storage unit 15, which unit permits discrimination of weak signals from the background noise by improving 20- to 30-fold the input-output signal-to-noise ratio. The signals are recorded on a chart of the recorder 18.

The radiospectrometer frequency is retuned either automatically or manually by means of a drive 48. The drive 48 is directly kinematically coupled to the rotor of the capacitor 21 (FIG. 2) of the high-frequency pulse oscillator 1.

The unit 4 for automatic retuning of the frequency of the heterodyne 5 compares the difference between the frequencies of the high-frequency pulse oscillator 1 and the variable frequency oscillator 5 with the intermediate tuning frequency of the receiver 16, and if the difference is found to be distinct from the intermediate frequency, the unit 4 applies a signal to the electric motor 7 to retune the frequency of the oscillator 5.

Thus the readjustment of the frequency of the oscillator 1 ensures continuous matching of the frequency of the oscillator 5 with the frequency of the high-frequency pulse oscillator 1.

The VHF-band The radiospectrometer according to the present invention for the study of nuclear quadrupole resonance in solid specimens ensures the search for such signals that have an unknown frequency, and especially weak signals whose amplitude is commensurable with the level of noise or lower. In this case, the design of the radiospectrometer permits automatic search of a signal within the range, with the signal being recorded on the recorder chart.

What is claimed is:

1. A VHF-band pulse radiospectrometer for the study of nuclear quadrupole resonance in solid specimens, comprising: a high-frequency pulse oscillator; a pulse unit connected to the input of said oscillator; and anode circuit in said oscillator; a retuning element for said anode circuit; an inductance coil for accommodating investigated solid specimens and being electrically connected to said oscillator; means for matching the resistance of said coil with that of said anode circuit, effecting electric coupling of said coil to said oscillator; a superheterodyne receiver for receiving nuclear quadrupole resonance signals of the investigated specimens; a mixer for said receiver, whose one input is connected to the output of said matching means; an IF amplifier in said receiver, the input thereof being connected to the output of said mixer; a variable-frequency oscillator with a circuit for said receiver, whose first output is connected to the other input of said mixer; a retuning element for said variable oscillator circuit; and automatic frequency retuning unit for said variable oscillator, one input thereof being connected to the output of said pulse oscillator, and the other input thereof being connected to the output of said variable oscillator; means for recording the resonance signals, whose input is connected to the output of said IF amplifier; an electric motor, electrically coupled to the output of said automatic frequency retuning unit and mechanically coupled to said element for retuning the variable oscillator circuit; drive means, mechanically coupled to said retuning element of the anode circuit; and controlled thermostatic means for lodging the investigated solid specimens; wherein said retuning elements are variable capacitors.

2. The pulse radiospectrometer as defined in claim 1, further comprising a feedback circuit in said high-frequency pulse oscillator; a variable reactance connected to said feedback circuit; and variable inductance coils in said anode circuit; and wherein said variable reactance is mechanically coupled to said variable inductance coils.

* * * * *